United States Patent [19]

Inaba et al.

[11] Patent Number: 4,530,062
[45] Date of Patent: Jul. 16, 1985

[54] METHOD AND APPARATUS FOR CONTROLLING INDUSTRIAL ROBOTS

[75] Inventors: Hajimu Inaba, Hino; Shinsuke Sakakibara, Kunitachi, both of Japan

[73] Assignee: Fujitsu Fanuc Limited, Minamitsuru, Japan

[21] Appl. No.: 387,850

[22] PCT Filed: Oct. 8, 1981

[86] PCT No.: PCT/JP81/00274
§ 371 Date: May 28, 1982
§ 102(e) Date: May 28, 1982

[87] PCT Pub. No.: WO82/01428
PCT Pub. Date: Apr. 29, 1982

[30] Foreign Application Priority Data
Oct. 13, 1980 [JP] Japan .................. 55-142606

[51] Int. Cl.$^3$ ............ G06F 15/46; G05B 19/42
[52] U.S. Cl. ..................... 364/513; 318/568; 318/632; 414/730; 901/3; 901/48
[58] Field of Search ............ 364/513, 191-193, 364/167-171; 318/568, 632, 646, 648; 901/2-5, 9, 48, 50; 414/730

[56] References Cited

U.S. PATENT DOCUMENTS

| | | |
|---|---|---|
| 3,827,333 | 8/1974 | Hurd .................... 318/632 X |
| 4,229,136 | 10/1980 | Panissidi ................. 901/9 X |
| 4,243,923 | 1/1981 | Whitney et al. ........... 318/646 X |
| 4,362,977 | 12/1982 | Evans et al. ............. 364/513 X |
| 4,362,978 | 12/1982 | Pollard et al. ........... 318/632 X |

Primary Examiner—Joseph Ruggiero
Attorney, Agent, or Firm—Staas & Halsey

[57] ABSTRACT

An industrial robot control method and apparatus having a pulse distributing circuit for executing a pulse distribution operation on the basis of positional command data from taught data to generate distributed pulses, a pulse coder for generating a feedback pulse each time the industrial robot moves a predetermined amount along the Z-axis, an error register for storing the difference between the number of distributed pulses and the number of feedback pulses, and positional control circuitry for positionally controlling the industrial robot in such a manner that said difference approaches zero, compensation being effected for an amount of bending $\Delta Z$ of an arm when a workpiece of weight $W$ is gripped. The industrial robot control apparatus includes a memory for storing an amount of bending $\Delta Z_o$ of the arm when a workpiece having a predetermined weight $W_o$ is gripped at an arm length $l_o$, an arithmetic circuit for computing an amount of bending $\Delta Z$ when a workpiece of weight $W$ is gripped at an arm length $l$, said computation being performed using $\Delta Z_o$, $l_o$, $W_o$, $l$ and $W$, and an adding circuit for adding $\Delta Z$ and an incremental commanded amount of movement $Z_d$ along the Z-axis and for delivering the sum of the pulse distributing circuit, the pulse distributing circuit generating distributed pulses corresponding to $(Z_d+\Delta Z)$, whereby a positional error due to bending is corrected.

12 Claims, 7 Drawing Figures

METHOD AND APPARATUS FOR CONTROLLING INDUSTRIAL ROBOTS

BACKGROUND OF THE INVENTION

1. Field of the Invention

This invention relates to a method and apparatus for controlling an industrial robot based on storing in advance either the amount of bending of an industrial robot arm when a workpiece having a predetermined weight $W_o$ is gripped, or information which enables the amount of bending to be estimated, computing the amount of bending of the arm owing to a workpiece whose weight W differs from the weight $W_o$ by using either the stored amount of bending or the information which enables the amount of bending to be estimated, as well as $W_o$, W and the like, and correcting the position of the arm based on the calculated amount of bending.

2. Description of the Prior Art

The rising cost of labor has given rise to a demand for labor-saving measures and for improvements in work procedures. Industrial robots have been put into use to meet this demand and have been very successful in doing so. Particularly outstanding results have been achieved in plants having numerous machine tools where industrial robots are used to perform such simple services as changing the workpieces and tools associated with each machine tool. The demand for such robots has grown yearly. Such industrial robots have a mechanical hand for gripping a workpiece at such time the workpiece is to be exchanged, a wrist capable of being twisted and tilted up and down, an arm which can be freely extended and retracted in the radial direction, a casing which can be moved vertically along the Z-axis and swiveled in the rotational direction, and the like. The mechanical hand, which is moved in the radial and rotational directions and along the Z-axis on the basis of taught data, mounts an unfinished workpiece in the chuck of a lathe, by way of example, and removes the machined workpiece from the chuck. When the mechanical hand is made to grip a load of considerable weight (such as a workpiece), the arm tends to bend in the direction of the force of gravity (along the Z-axis). Consequently, when the robot is taught its services in the absence of a load (that is, without the hand gripping an object) and the robot is then controlled on the basis of the taught data, the position of the arm will be displaced from the taught position by the amount of bending when a workpiece is to be mounted in the chuck of a lathe or the like. This makes it impossible to mount the workpiece in the chuck with great accuracy and, in extreme cases, may make it impossible to mount the workpiece at all. Conversely, when the robot is taught while the hand is gripping a workpiece of a predetermined weight, the workpiece cannot be gripped accurately when it is to be removed from the chuck. This may cause the workpiece to fall or make it impossible to remove the workpiece.

It has been conventional practice to teach the robot while it is actually being made to mount and remove a workpiece. The mounting and unmounting operations are taught each time the weight of a workpiece changes in order to eliminate a positioning error or operational error caused by the amount of bending. However, carrying out these teaching operations one at a time is troublesome and considerably time-consuming, resulting in markedly reduced robot service efficiency.

SUMMARY OF THE INVENTION

Accordingly, an object of the present invention is to provide an industrial robot control system which enables workpieces to be mounted and removed with great accuracy without requiring a teaching operation for the mounting and unmounting tasks, and without requiring a teaching operation each time there is a change in the weight of a workpiece, that is, which enables the workpieces to be mounted and removed merely by teaching the robot these tasks in an unloaded condition.

In the present invention, operation proceeds by storing in advance either the amount of bending of an arm when a workpiece having a predetermined weight $W_o$ is gripped, or information which enables the amount of bending to be estimated, computing the amount of bending of the arm owing to a workpiece whose weight W differs from the weight $W_o$ by using the stored amount of bending as well as $W_o$, W and like, and correcting the position of the arm based on the computed amount of bending. Specifically, the arrangement is such that the amount of bending caused by a workpiece of any weight can be computed. Accordingly, it suffices if only a single teaching operation is carried out under an unloaded condition, without requiring that teaching operations be performed for workpieces of various weights, and without requiring teaching operations for the mounting and demounting tasks. This simplifies the teaching operation greatly and improves the operating efficiency of the robot. Further, highly accurate positioning becomes possible because positioning errors caused by the amount of bending, which is brought about by the weight of the workpiece, can be corrected automatically. Since the workpiece can be gripped automatically, moreover, it is possible to mount and remove the workpiece correctly without dropping it.

BRIEF DESCRIPTION OF DRAWINGS

FIG. 1 shows an example of an industrial robot to which the present invention can be applied, in which

DESCRIPTION OF THE PREFERRED EMBODIMENT

Figure 1A:
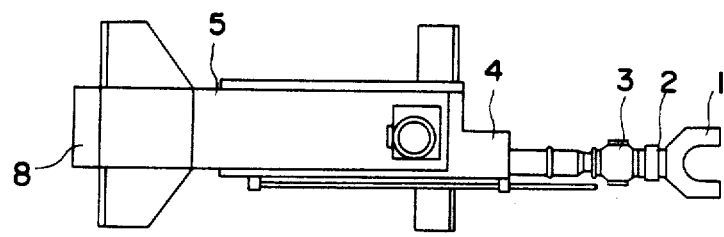
FIG. 1(a) is a plan view and FIG. 1(b) a side view.
Figure 1B:
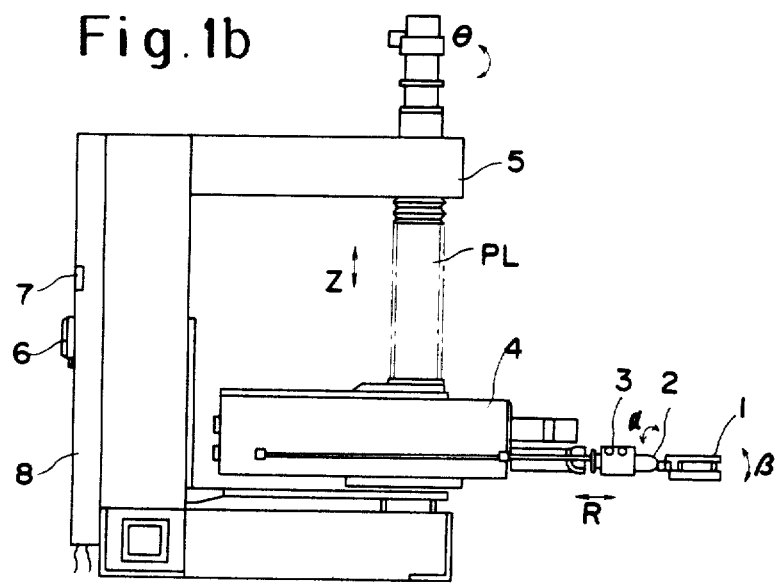

FIG. 1 shows an example of an industrial robot to which the present invention can be applied, in which FIG. 1 (a) is a plan view and FIG. 1(b) a side view. In the Figure, numeral 1 denotes a mechanical hand for gripping a workpiece when, say, it is to be exchanged, numeral 2 denotes a wrist which is capable of being twisted ($\alpha$-axis) and tilted up and down ($\beta$-axis), numeral 3 denotes an arm which can be freely extended and retracted (R-axis), and numeral 4 a casing which can be moved vertically (Z-axis) along a shaft PL and swiveled ($\theta$-axis). Numeral 5 denotes a frame, 6 a teaching box for teaching robot motions, 7 an operator's panel for manipulation by the operator, and 8 a control unit for storing, in succession, the data taught by the teaching box 6, such as the operation position (point), operating speed and the various services, and for controlling the motion of the mechanical hand 1, wrist 2, arm 3 and casing 4 in accordance with the taught data.

With such play-back type industrial robots, the teaching box 6 teaches the service operations, and the taught data (referred to as robot instruction data hereinafter) is stored in a memory within the control unit 8. Whenever a request for a service arrives from the machine tool side, a series of the above robot instruction data is read out of the memory sequentially, and the robot responds by servicing the machine in repeated fashion.

The robot instruction data comprises positional information regarding the point at which a service is to be performed, robot operating speed, and service codes which instruct how the hand is to be controlled at the above-mentioned point and which instruct also the exchange of signals with the machine tool side, and the like. In general, the teaching operation mentioned above proceeds in the following order: (1) establish the memory addresses at which the items of robot instruction data are to be stored; (2) execute positioning by a jog-feed (manual feed); (3) set the positional information regarding the positioned point, as well as the speed command value; and (4) set the robot service codes. A series of robot operations for a machine tool is taught be repeating the sequence (1) through (4).

Accordingly, as long as there are no problems with the mechanism or control system of the robot, and after the robot has been positioned at the predetermined operating speed in accordance with the robot instruction data, the robot will sequentially and correctly execute such services as workpiece exchange, cleaning of machining scraps, manipulation of the hand and the like, each time a service request is received.

Figure 2:
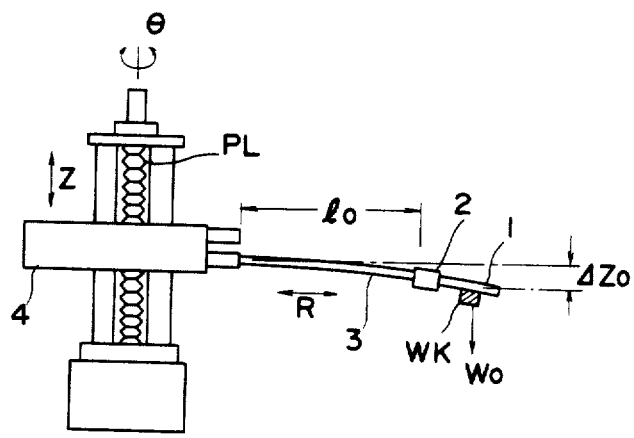
FIG. 2 is an illustrative view for describing the bending of an arm.
Figure 3:
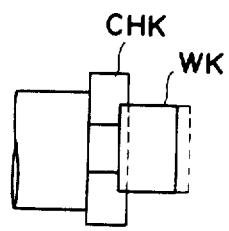
FIG. 3 is an illustrative view for describing the mounting and removal of a workpiece with respect to a chuck.

FIG. 2 is an illustrative view for describing the bending of an arm, and FIG. 3 is an illustrative view for describing the mounting and removal of a workpiece with respect to a chuck. Portions which are the same as those shown in FIG. 1 are designated by like reference characters and are not described in detail here.

When the mechanical hand 1 is made to grip a workpiece WK of weight $W_o$ with the arm 3 extended by a distance $l_o$, the arm 3 bends by an amount $\Delta Z_o$ in the direction of the force of gravity (FIG. 2). When it is attempted to mount the workpiece WK in the chuck CHK of the lathe, as shown by the solid lines in FIG. 3, the mounting operation cannot be performed correctly, as shown by the dashed line, owing to the bending of the arm. Or, when it is attempted to remove the workpiece from the chuck, such removal is not possible because of the bending of the arm.

Experimentally, the amount of bending is proportional to the weight of the workpiece WK and to the cube of the arm length. If the mechanical hand 1 is made to grip a workpiece WK of weight W with the arm extended by the distance l, then the amount of bending Z of the arm 3 will be given by:

$$\Delta Z = \left(\frac{l}{l_o}\right)^3 \cdot \frac{W}{W_o} \cdot \Delta Z_o. \quad (1)$$

In accordance with the present invention, therefore, the amount of bending $\Delta Z_o$ of the arm 3, for an arm length $l_o$ and a workpiece weight $W_o$, is measured in advance and then stored in memory. Then, using Eq. (1), the amount of bending $\Delta Z$, for an arm length l and a workpiece weight W, is computed, and the position along the Z-axis is corrected by the amount of bending, whereby highly accurate positioning can be achieved.

Figure 4:
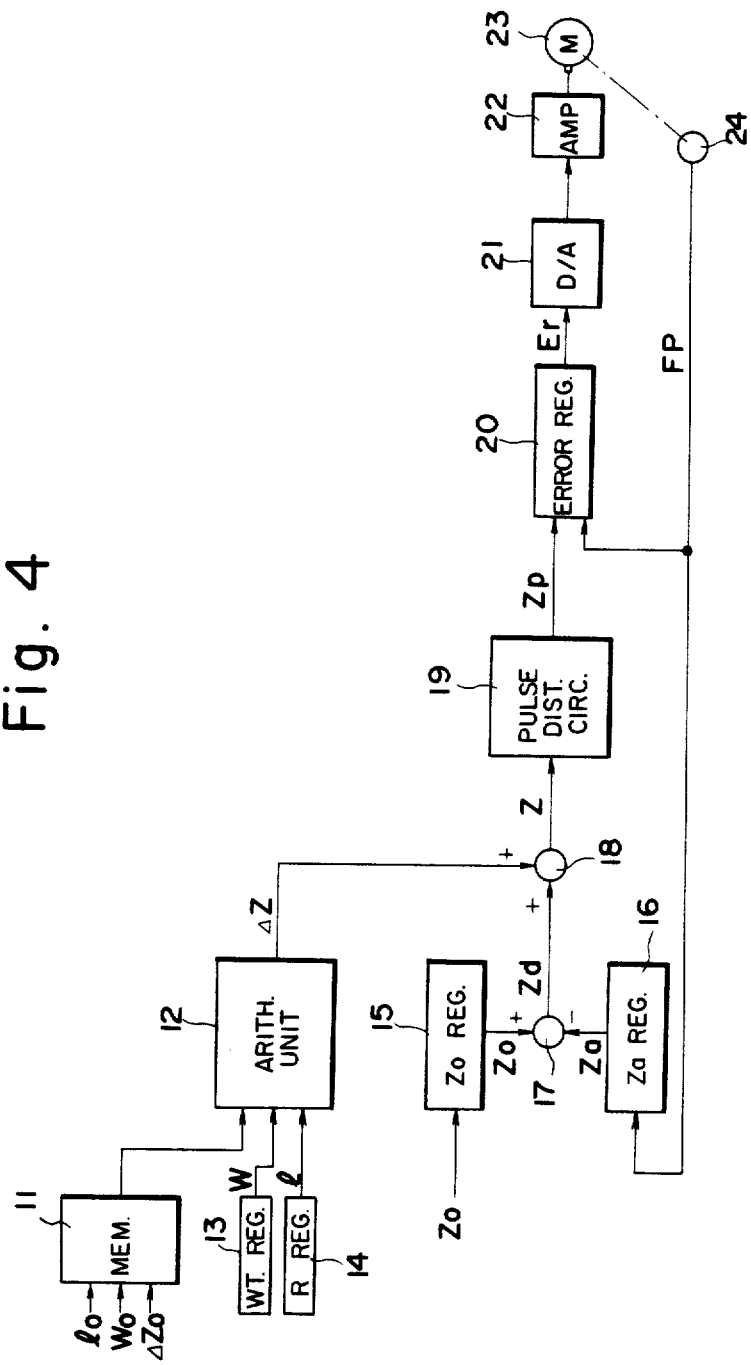
FIGS. 4, 5 and 6 are circuit block diagrams illustrating embodiments of the present invention.

FIG. 4 is a circuit block diagram for describing an industrial robot control method according to the present invention.

In the Figure, numeral 11 denotes a storage device for storing the length $l_o$ of the arm, the weight $W_o$ of the workpiece, and the amount of bending $\Delta Z_o$. The values of $l_o$, $W_o$ and $\Delta Z_o$ are entered from a digital switch or the like on a panel. Numeral 12 denotes an arithmetic circuit for computing the amount of bending. The arithmetic circuit 12 performs the operation specified by Eq. (1) to compute the amount of bending $\Delta Z$. Numeral 13 designates a weight register for storing a workpiece weight W. The weight W enters together with numerical control data from an external input medium such as a paper tape. Numeral 14 denotes an R-axis commanded position register for storing the commanded position on the R-axis, namely the distance l of the arm at the target position. Designated at 15 is a Z-axis commanded position register for storing the commanded position $Z_o$ on the Z-axis, which position enters from the paper tape or the like. Numeral 16 denotes storage means for storing the present position $Z_a$ on the Z-axis. Means 16 is constituted by a reversible counter for reversibly counting, in accordance with the direction of movement, feedback pulses FP each of which is generated whenever the casing 4 (FIGS. 1 and 2), or a casing drive motor, moves or rotates by a predetermined amount. Numeral 17 denotes a subtracting circuit which computes and then delivers an incremental value $Z_d = (Z_o - Z_a)$ which is the difference between the commanded position $Z_o$ and present position $Z_a$ on the Z-axis. Designated at 18 is an adding circuit for adding the amount of bending $\Delta Z$ and the difference $Z_d$, and for delivering an incremental amount of movement Z which takes the amount of bending into consideration. Numeral 19 denotes a well-known pulse distributing circuit, and numeral 20 denotes an error register consisting of, say, a reversible counter, for storing the difference Er between the number of distributed pulses $Z_p$ generated by the pulse distributing circuit 19, and the number of feedback pulses FP. Specifically, if it is assumed that the arm is moving in the +Z direction, then the content of the counter is counted up each time a distributed pulse $Z_p$ is generated and counted down each time a feedback pulse FP is generated, whereby the difference $E_r$ between the number of distributed pulses and feedback pulses is stored. Numeral 21 denotes a DA converter for generating an analog voltage which is proportional to the content of the error register 20. Designated at 22 is an amplifier. Numeral 23 denotes a DC motor for driving the arm, and 24 a pulse coder for generating a single feedback pulse each time the DC motor 23 rotates by a predetermined amount.

The operation of FIG. 4 will be described next.

Robot motions are taught in advance with the robot in the unloaded condition, and the quantitites $l_o$, $W_o$, $\Delta Z_o$ are stored in storage device 11, also in advance. The workpiece weight W and the commanded position l on the R-axis are set in the weight register 13 and in the R-axis commanded position register 14, respectively, and the Z-axis commanded position $Z_o$ is set in the Z-axis commanded position register 15. When this has been accomplished, the arithmetic circuit 12 performs the operation specified by Eq. (1) and delivers the amount of bending $\Delta Z_o$. Concurrently, the subtracting circuit 17 computes the difference $Z_d$ between the commanded position $Z_o$ and the present position $Z_a$ on the Z-axis, and delivers the computed difference. When $Z_d$ and $\Delta Z$ have been found, the adding circuit 18 performs the operation:

$$Z_d + \Delta Z \rightarrow Z \tag{2}$$

to find the incremental amount of movement Z which takes the amount of bending $\Delta Z$ into consideration. This is applied to the pulse distributing circuit 19. When the pulse distributing circuit 19 receives the amount of movement Z, it immediately executes a pulse distributing operation to generate the distributed pulses $Z_p$, which are applied to the error register 20. The error register 20 has its content counted up each time a distributed pulse $Z_p$ arrives. The content of the register 20 is DA-converted by DA converter 21, amplified by amplifier 22 and applied to the DC motor 23 to rotate the motor. When the DC motor 23 rotates by a predetermined amount, the pulse coder 24 generates a single feedback pulse FP. The feedback pulse FP is fed back to the Z-axis present position register 16 and to the error register 20. The Z-axis present position register 16 is adapted to count the feedback pulses reversibly, in accordance with the direction of movement, each time a feedback pulse FP is generated. The error register 20 has its content counted down each time a feedback pulse is generated. Under steady conditions, the content of error register 20 represents a constant value or steady deviation which corresponds to the delay in the servo system. The motor, namely the robot, is moved at the taught operating speed as the foregoing operations are repeated, with the content of error register 20 maintaining said steady deviation. When $(Z_d+Z)$ number of pulses are distributed along the Z-axis, the pulse distributing operation performed by the pulse distributing circuit 19 ceases, and the rotation of DC motor 23 eventually stops after the generation of a number of pulses equivalent to the value of the steady deviation left in the error register 20. Now, the arm 3 (Fig.2) is at the correct position, which has been compensated along the Z-axis by the amount of bending $\Delta Z_o$, enabling the workpiece WK to be correctly mounted in the chuck CHK (FIG. 3) and removed from the chuck.

The foregoing embodiment is for a case where the workpiece weights W enter from a paper tape or the like one at a time. It is possible, however, to estimate weights W from the value of the steady deviation in error register 20, without entering the weights from the paper tape, etc.

Figure 5:
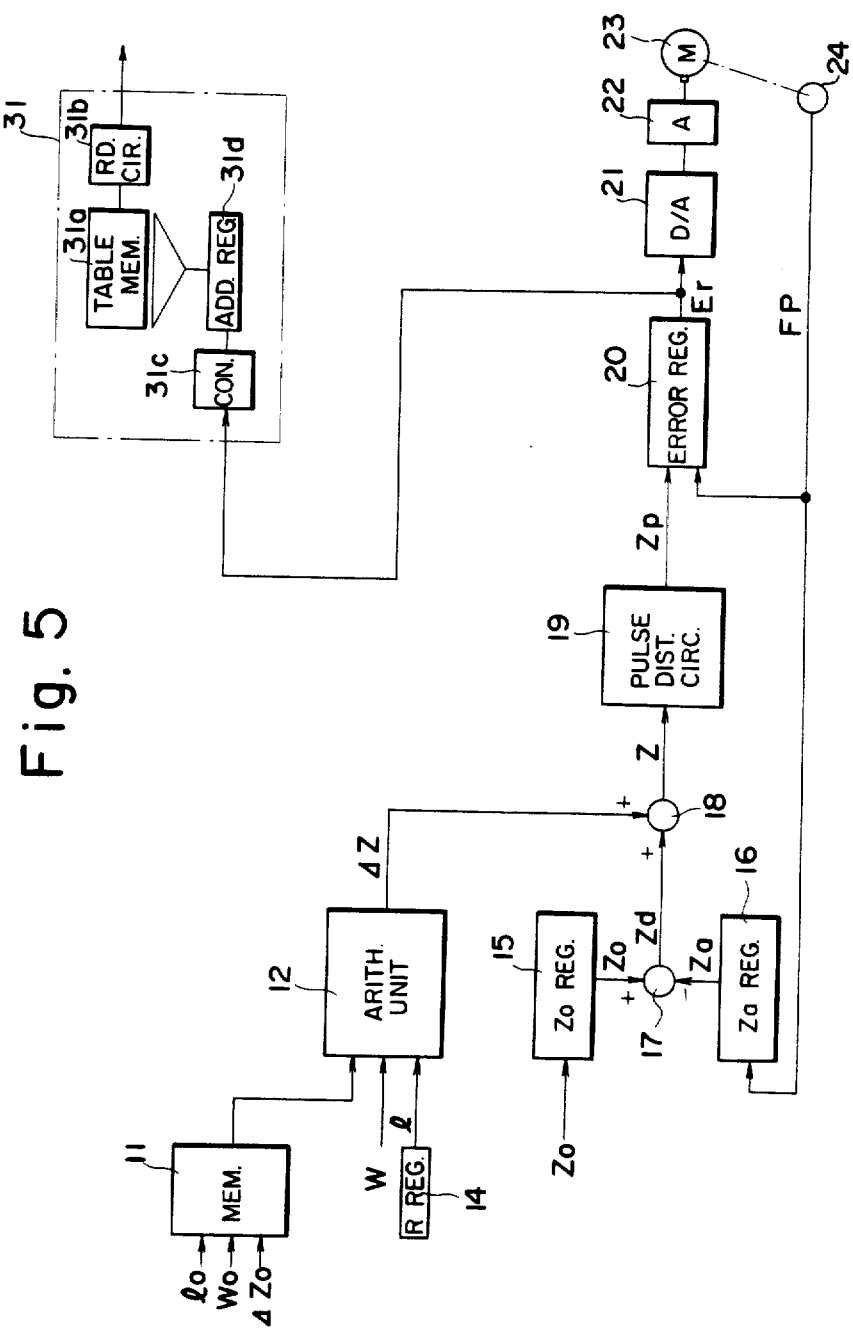

FIG. 5 shows an embodiment of the present invention for a case where bending is corrected for by estimating the weight from the content of the error register 20. Portions the same as those shown in FIG. 4 are designated by like reference characters and are not described in detail here.

In the Figure, numeral 31 denotes a weight generating circuit. The delay in the servo system, namely the content of error register 20 (the value of the steady deviation), changes in accordance with the weight of the workpiece. More specifically, the greater the weight of the workpiece, the greater the value of the steady deviation; the lighter the weight, the smaller the value of the steady deviation. Accordingly, if weights W are measured for a variety of steady deviation values $E_r$ at a predetermined operating speed F, and if a table is prepared for storing the correspondance between the weights and deviation values, then the weights W at the operating speed F can be inferred from the deviation values. To this end, the weight generating circuit 31 is composed of the above-mentioned table (memory) 31a, a read circuit 31b for reading the weight W out of the table, an address converter 31c for converting the steady deviation values into addresses at which the weights corresponding to the steady deviation values will be stored, an address register 31d, and the like.

It should be noted that while the amount of bending has been computed using Eq. (1), it is not strictly necessary to employ this equation. Any suitable equation may be used for the computation.

Figure 6:
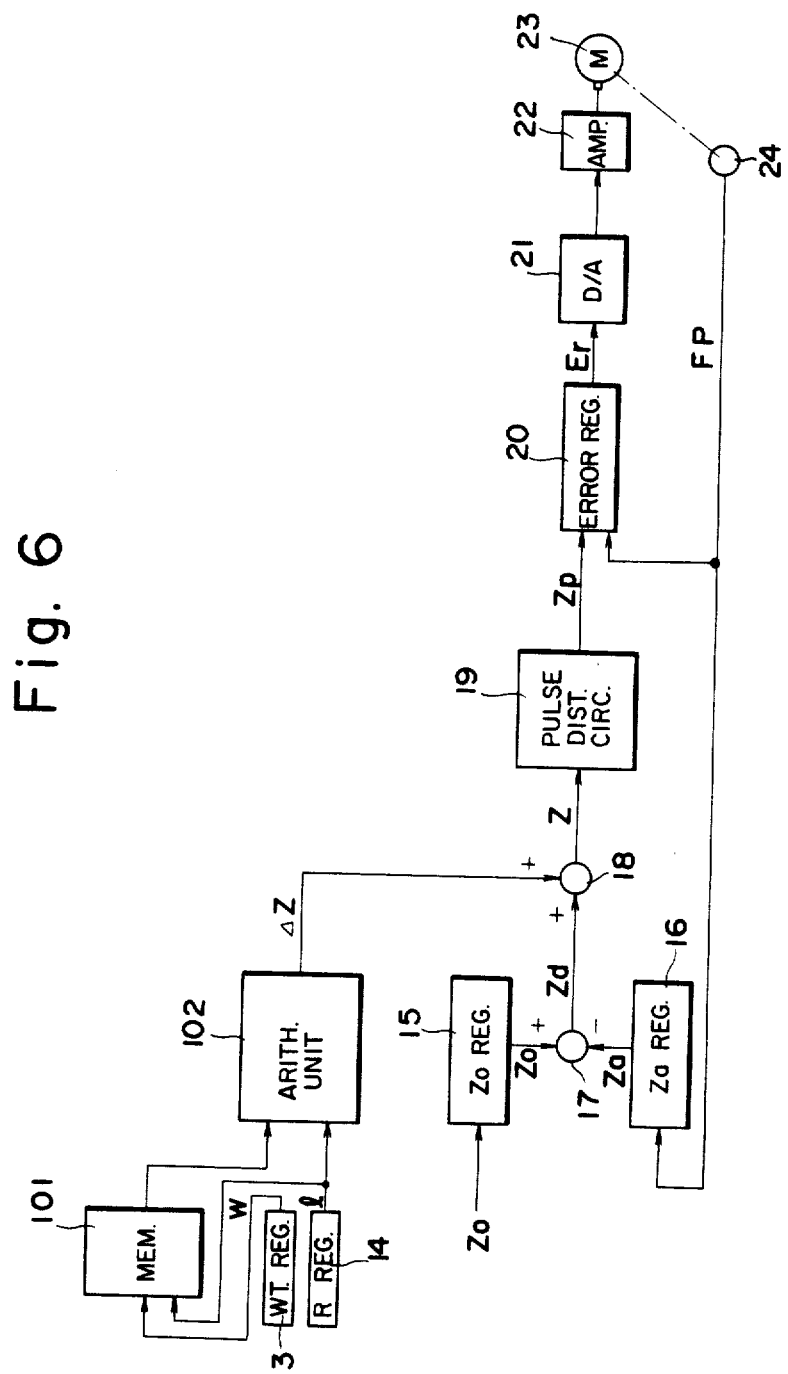

The foregoing embodiment is for a case where the amount of bending is computed using Eq. (1). It is also possible, however, to compute the amounts of bending $\Delta Z$ in advance for various arm lengths l and workpiece weights W and store the bending amounts in memory, and then read the bending amounts out of the memory for predetermined values of l and W. FIG. 6 shows such an embodiment of the present invention.

In the Figure, numeral 101 denotes a memory for storing amounts of bending $\Delta Z$ for various arm lengths l and workpiece weights W. Numeral 102 denotes an arithmetic circuit for amounts of bending, which circuit computes amounts of bending $\Delta Z$ from the following equation:

$$\Delta Z = \Delta Z_1 + \frac{\Delta Z_2 - \Delta Z_1}{L_2 - L_1}(L - L_1) \tag{3}$$

In other words, if we assume that the arm will bend by $\Delta Z_1$ for a workpiece weight $W_o$ and arm length $L_1$, and by $\Delta Z_2$ for a workpiece weight $W_o$ and arm length $L_2(>L_1)$, then Eq. (3) will give the amount of bending $\Delta Z$ for a workpiece weight $W_o$ and arm length L ($L_1 \leq L \leq L_2$). The amount of bending $\Delta Z_1$ for $W_o$, $L_1$, and the amount of bending $\Delta Z_2$ for $W_o$, $L_2$, are stored in memory 101. Portions which are the same as those shown in FIG. 4 are designated by like reference numerals and are not described in detail here.

In accordance with the present invention as described above, amounts of bending are found for various weights, and a positional correction is effected on the basis of the amount of bending. As a result, a high degree of positioning accuracy can be achieved with respect to a commanded position, enabling a workpiece to be gripped reliably and to be mounted in a chuck in accurate fashion.

As stated hereinabove, the present invention enables a workpiece to be mounted and removed accurately even if the arm bends owing to the applied weight. This increases the reliability of industrial robot operation and results in a robot of great industrial utility.

What is claimed is:

1. In an industrial robot control method for actuating an industrial robot in accordance with taught data, said robot having an arm of variable length, the improvement comprising the steps of: measuring and storing beforehand an amount of bending $\Delta Z_o$ of the arm when a workpiece having a predetermined weight $W_o$ is gripped at an arm length $l_o$; computing an amount of bending $\Delta Z$ when a workpiece having a weight W which differs from said weight $W_o$ is being gripped at an arm length l, said computation being performed using said stored amount of bending $\Delta Z_o$ as well as additional parameters including $l_o$ and $W_o$; and correcting the position of the arm on the basis of said computed amount of bending $\Delta Z$.

2. An industrial robot control method according to claim 1, wherein the step of computing the amount of bending $\Delta Z$ is computed from:

$$\Delta Z = \left(\frac{l}{l_o}\right)^3 \cdot \frac{W}{W_o} \cdot \Delta Z_o$$

3. An industrial robot control method according to claim 2, wherein the step of correcting the position of the arm comprises the steps of applying $(Z_d + \Delta Z)$ to a pulse distributor as an amount of movement along the Z-axis that takes the amount of bending into account, $Z_d$ representing an incremental command amount of movement along the Z-axis; and applying distributed pulses corresponding to $(Z_d + \Delta Z)$ to a Z-axis servo circuit.

4. An industrial robot control method according to claim 1, further comprising the step of entering said workpiece weight W from an external input unit.

5. In an industrial robot control method for controlling an industrial robot in accordance with taught data and for controlling the position of a variable-length arm of said industrial robot by executing a pulse distribution operation on the basis of positional command data from the taught data, said method being of the type which includes the steps of storing in an error register the difference between the number of distributed pulses provided by said pulse distribution operation and the number of feedback pulses generated each time the industrial robot moves by a predetermined amount, and DA-converting said difference and controlling the position of the arm in accordance with the DA-converted output, the improvement comprising the steps of: measuring and storing beforehand the amount of bending $\Delta Z_o$ of the arm when a workpiece having a predetermined weight $W_o$ is gripped at an arm length $l_o$; determining and storing beforehand a table of corresponding relationships between said difference stored in the error register and the weight of a workpiece; reading an actual workpiece weight W using the difference stored in the error register; computing an amount of bending $\Delta Z$ when a workpiece having a weight W is gripped at an arm length l, said computation being performed using said stored amount of bending $\Delta Z_o$ as well as additional parameters including $l_o$ and $W_o$; and correcting the position of the arm on the basis of said computed amount of bending $\Delta Z$.

6. An industrial robot control method according to claim 5, wherein the step of computing the amount of bending $\Delta Z$ is computed from:

$$\Delta Z = \left(\frac{l}{l_o}\right)^3 \cdot \frac{W}{W_o} \cdot \Delta Z_o$$

7. An industrial robot control method according to claim 5, wherein the step of correcting the position of the arm comprises the steps of applying $(Z_d + \Delta Z)$ to the pulse distributor as an amount of movement along the Z-axis that takes the amount of bending into account, $Z_d$ representing an incremental command amount of movement along the Z-axis; and applying distributed pulses corresponding to $(Z_d + \Delta Z)$ to a Z-axis servo circuit.

8. In an industrial robot control method for actuating an industrial robot in accordance with taught data, said robot having an arm of variable length, the improvement comprising the steps of: measuring and storing beforehand amounts of bending $\Delta Z_i (i = 1, 2, \ldots)$ of the arm when a workpiece having a predetermined weight W is gripped at various arm lengths $l_i (i = 1, 2, \ldots)$; computing the amount of bending $\Delta Z$ when a workpiece having a weight W is gripped at an arm length $l_j$ ($l_i < l_j < l_{i+1}$), said computation being performed using the equation $$\Delta Z = \Delta Z_i + \frac{\Delta Z_{i+1} - \Delta Z_i}{l_{i+1} - l_i}(l_j - l_i);$$

and correcting the position of the arm on the basis of said computed amount of bending $\Delta Z$.

9. An industrial robot control method according to claim 8, further comprising characterized by including the step of storing beforehand amounts of bending for various arm lengths $l_i (i = 1, 2, \ldots)$, while changing the weight.

10. In an industrial robot control apparatus having a pulse distributing circuit for executing a pulse distribution operation on the basis of positional command data from taught data to generate distributed pulses, a pulse coder for generating a feedback pulse each time the industrial robot moves a predetermined amount along the Z-axis, an error register for storing the difference between the number of distributed pulses and the number of feedback pulses, and positional control means for positionally controlling the industrial robot in such a manner that said difference approaches zero, the improvement comprising: memory means for storing the amount of bending $\Delta Z_o$ of the arm when a workpiece having a predetermined weight $W_o$ is gripped at an arm length $l_o$; arithmetic circuit means for computing an amount of bending $\Delta Z$ when a workpiece of weight W is gripped at an arm length l, said computation being performed using said amount of bending $\Delta Z_o$ as well as $l_o$ and $W_o$; and adding circuit means for adding an incremental commanded amount of movement $Z_d$ along the Z-axis and said amount of bending $\Delta Z$ and for delivering the sum to the pulse distributing circuit, said pulse distributing circuit generating distributed pulses corresponding to $(Z_d + \Delta Z)$.

11. An industrial robot control apparatus according to claim 10, further comprising: additional memory means for storing beforehand a table of corresponding relationships between the difference stored in said error register and the weight of a workpiece; and means for finding the weight of a workpiece in said additional memory means and applying same to said arithmetic circuit means.

12. An industrial robot control apparatus according to claim 10, wherein said memory means comprises means for storing amounts of bending $\Delta Z_i (i+1, 2, \ldots)$ of the arm when a workpiece having a predetermined weight $W_o$ is gripped at various arm lengths $l_i (i = 1, 2, \ldots)$.

* * * * *

UNITED STATES PATENT AND TRADEMARK OFFICE
CERTIFICATE OF CORRECTION

PATENT NO.   :   4,530,062
DATED        :   July 16, 1985
INVENTOR(S)  :   HAJIMU INABA ET AL.

It is certified that error appears in the above-identified patent and that said Letters Patent is hereby corrected as shown below:

Col. 3, line 25, "be" should be --by--;

Col. 5, line 66, "correspondance" should be --correspondence--;

Col. 8, line 22, delete "characterized by including".

Signed and Sealed this

Nineteenth Day of November 1985

[SEAL]

Attest:

DONALD J. QUIGG

Attesting Officer

Commissioner of Patents and Trademarks